May 5, 1959 — A. R. BERMAN — 2,884,977
CARRIER
Filed June 25, 1957
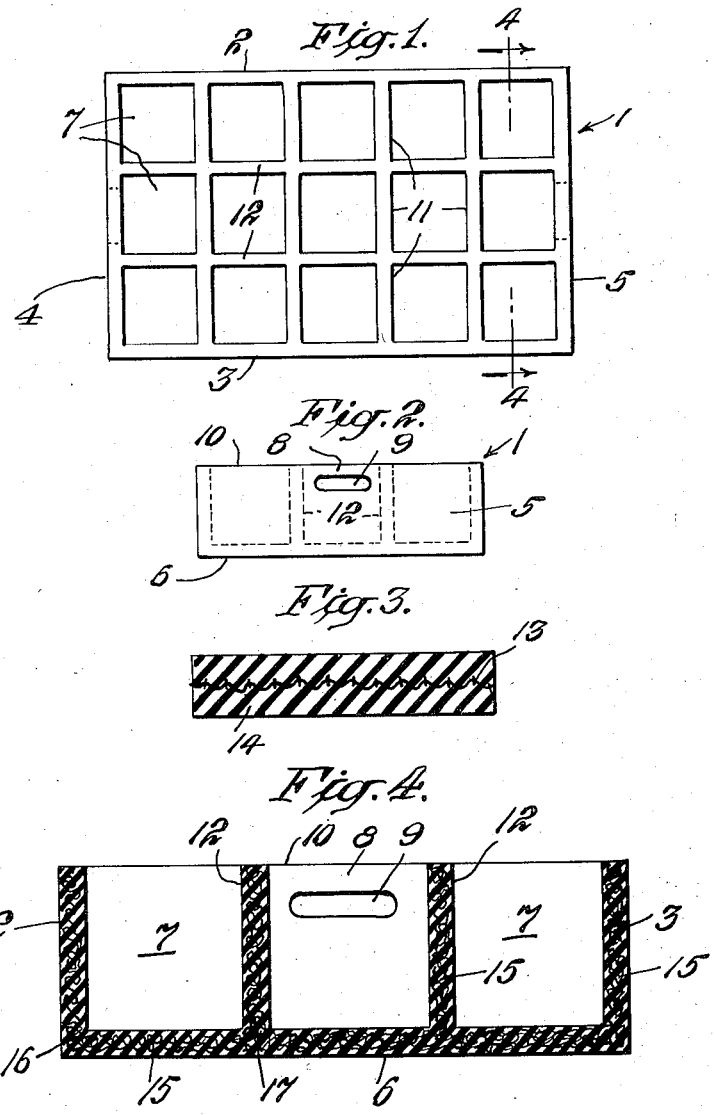
INVENTOR.
AARON R. BERMAN
BY
ATTORNEY United States Patent Office 2,884,977
Patented May 5, 1959

2,884,977
CARRIER
Aaron R. Berman, Glen Ridge, N.J.
Application June 25, 1957, Serial No. 667,864
1 Claim. (Cl. 150—.5)

The present invention deals with a carrier and more particularly with a compartmented carrier.

While compartmented carriers, such as carriers for bottles, cans, etc., are manufactured from a variety of material, there are instances where carriers of resilient materials, such as rubber, plastics and the like, are advantageous in the handling and carrying of containers which are subject to damage or breakage by mechanical shock. Where the load carried by resilient carriers is considerable, such resilient carriers are subject to deformation or distortion when handled with the result that the stability of position of the contents is adversely affected and whereby undesirable distortion pressures are imparted to the contents.

It is an object of the present invention to provide a resilient compartmented carrier which absorbs undesirable shock to which the contents of the carrier would be normally subjected to and which otherwise retains its shape and form. It is a further object of this invention to provide a compartmented carrier comprised of reinforced rubber and/or rubber substitutes commonly referred to as synthetic rubber, whereby the carrier is stable as to shape and form and which possesses sufficient resiliency to substantially absorb shocks, due to handling, which would otherwise be transmitted to the contents. Other objects and advantages of this invention will become apparent from the description hereinafter following and the drawings forming a part hereof, in which:

Figure 1 is a top view of a compartmented carrier,
Figure 2 is an end view of Figure 1,
Figure 3 is a cross-section view of a composite material, and
Figure 4 is an enlarged cross-sectional view along lines 4—4 of Figure 1.

According to the invention, there is provided a carrier, especially a compartmented carrier, which is composed of reinforced rubber and which possesses sufficient resiliency to absorb mechanical shock while still retaining its shape and form even under substantially heavy loads, and which because of its particular construction is substantially indestructable under normal usage and, therefore, requires no maintenance whatsoever.

Figures 1 and 2 illustrate top and end views of a compartmented carrier according to the invention and which comprises a rectangular vessel 1 having side walls 2 and 3, end walls 4 and 5 and bottom wall 6 providing a cavity which is divided into a plurality of discrete compartments 7 for holding containers or other articles.

The end walls 4 and 5 are provided with a gripping or grasping means 8 which may be made by forming a rectangular slot 9 through the end walls and spaced a short distance from the rim 10 of the vessel and permitting grasping of the vessel in known manner.

The compartments 7 are provided by forming spaced interconnected compartment walls 11 and 12 perpendicular to each other and connected to the sides and bottom of the vessel.

In manufacture of a carrier, according to the invention, composite rubber material, for example unvulcanized pieces of rubber sheet, strips or the like, comprising a substantially embedded layer of reinforcing fibers, filaments or yarns 13 of cotton, nylon, etc., and a layer of rubber 14 embedding said yarns, according to Figure 3, are provided as a loose or compacted mixture of pieces of varying sizes and placed in a mold shaped to provide a carrier according to Figures 1 and 2. In the molding process, the rubber of the heterogeneous mixture of rubber pieces is first plasticized under the application of heat and pressure at temperatures below the vulcanization temperature of the rubber, whereby the rubber becomes relatively plastic and enabled to conform to the mold, and which permits the fibres or yarns to migrate and distribute themselves throughout the thickness of the newly formed walls of the vessel, and then the temperature is permitted to rise and maintained under pressure until the composite rubber is vulcanized, which vulcanization sets the fibers and rubber with the fibres being in interengaged condition and embedded in the rubber. During molding the reinforcing fibriform members of various lengths become intertangled with each other throughout the rubber matrix. The term "fibriform members" refers to fibers and filaments and yarns composed thereof. The mass of interengaged yarns or filaments become substantially compacted by the molding pressures.

Upon removal of the carrier from the mold, the substantially compacted interengaged and tangled mass of yarns or filaments are interlocked with each other throughout the thickness of the carrier walls.

Referring to Figure 4, the substantially uniform yarn layers 13 of Figure 3 are shown dissociated from the rubber layers 14 and in the form of interengaged and interlocked yarns 15 throughout the thickness of the rubber walls 3, 4, and 6. The interlocked yarns 15 are embedded in the rubber matrix and interconnect the joint areas 16 and 16 whereby the integral joints are reinforced by the interlocked yarns which retard the flexibility of the joint areas as well as the walls of the carrier. It is apparent that the interlocked tangled mass of yarns cooperate to restrict the flexibility and impart rigidity to the carrier walls and joints by the said interlocking function, whereby the carrier is provided with stability even under heavy loads since the strains of such heavy loads are effectively counteracted by the reinforcing yarns.

While the invention has been described with reference to the specific drawings, various modifications of shape and form are contemplated within the scope of the appended claim.

What I claim is:

A molded compartmented vessel comprising a bottom wall and side walls, interconnected compartment walls in said vessel joining the side walls and bottom wall forming a plurality of discrete compartments, the vessel including said compartment walls being composed of a rubber matrix having embedded therein reinforcing material in the form of a mass of interengaged yarns distributed throughout the matrix, the yarns having varying lengths and comprising a tangled interlocked mass of said yarns, the interconnected wall joints and compartment joints being integral joints and the interlocked yarns interconnecting the joints.

References Cited in the file of this patent
UNITED STATES PATENTS

| 2,119,773 | Buckner | June 7, 1938 |
| 2,335,371 | Willis | Nov. 30, 1943 |
| 2,594,235 | Taylor | Apr. 22, 1952 |
| 2,600,974 | Crawford | June 17, 1952 |
| 2,613,397 | Borkland | Oct. 14, 1952 |
| 2,672,902 | Prager | Mar. 23, 1954 |
| 2,679,878 | Stine | June 1, 1954 |
| 2,731,996 | Hayes | Jan. 24, 1956 |